United States Patent
San Martin et al.

(10) Patent No.: US 6,681,205 B1
(45) Date of Patent: Jan. 20, 2004

(54) METHOD AND APPARATUS FOR ENROLLING A USER FOR VOICE RECOGNITION

(75) Inventors: Michelle San Martin, San Francisco, CA (US); Robert C Wohlsen, Menlo Park, CA (US); Cecily Baptist, Concord, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 09/466,418

(22) Filed: Dec. 17, 1999

Related U.S. Application Data (63) Continuation-in-part of application No. 09/351,723, filed on Jul. 12, 1999.

(51) Int. Cl.[7] .............................................. G10L 15/06
(52) U.S. Cl. ...................................... 704/243; 704/273
(58) Field of Search ............................... 704/243, 244, 704/246, 251, 273

(56) References Cited

U.S. PATENT DOCUMENTS 5,897,616 A * 4/1999 Kanevsky et al. ....... 379/88.02

OTHER PUBLICATIONS

Dr. Bruno Beek et al.; Speaker Authentication and Voice Data Entry; pp. 266–273; 1978.*

"Hands on with . . . Glenview State Bank," *VoiceID Quarterly*, Jul. 1998, pp. 1&5. v. 2, Issue 3.

"Rapid Fire," *VoiceID Quarterly*, Jul. 1999, pp. 1–7, v. 3, Issue 3.

"Notes: Speaker Verification at InTrust Bank," May 22, 1998.

Betsy Wexler, "Notes from Glenview State Bank."

Randy Goldberg, "Automated Speaker Verification," presented of AT&T Laboratories—Applied Speech Technology Group to Charles Schwab, Oct. 5, 1998, pp. 1–6.

Telematics Applications Programme, "Cave," May 29, 1998, http://guagua.echo.lu/langeng/en/le1/cave, pp. 1 &1–7.

"Voice Venders Design Systems for Customers Banking on Security," *Voice Technology & Service News*, Dec. 9, 1997, pp. 4–5.

"In Touch introduces telecommunications assistant," *Speech Recognition Update*, Dec. 1997, p. 5.

(List continued on next page.)

*Primary Examiner*—Tālivaldis Ivars Šmits
*Assistant Examiner*—Abul K. Azad
(74) *Attorney, Agent, or Firm*—Innovation Partners; Charles E. Gotlieb (57) ABSTRACT

A method and apparatus enrolls a user for voice recognition by prompting the user to speak a social security number or other number. A voiceprint is extracted from the social security number. Additional sequences of numbers are generated so that the total number of times each decimal digit appears in the social security number or the additional sequences meets or exceeds a threshold value. The user is then prompted to speak the additional sequences and the voiceprint extracted from the social security number is refined to include the additional information received from the responses to the prompts for the sequences. A standard sequence may also be prompted and a voiceprint of the standard sequence compared with the voiceprints of other users speaking the same standard sequence to identify the level of differentiation between the user's voice and other user's voices. If the comparison determines the level of differentiation is low, the user may be prompted to speak his or her social security number again and/or the same or additional sequences and the user's voiceprint further refined from these additional responses.

21 Claims, 4 Drawing Sheets

OTHER PUBLICATIONS

Nuance Communications, "Nuance Verifier," May 13, 1998, pp. 2–10.

T–Netix, Inc., "T–Netix," May 14, 1998, http://www.ctaonline.com/tnetix.htm#aa, pp. 1–33.

Tami Luhby, "In Apparent First, Bank to ID Customers by Voice," *American Banker*, Jul. 10, 1997.

Richard Mammone, "Your Voiceprint Will Be Your Key," *Speech Technology On Line*, 01–Feb. 1998, http://www.speechtechmag.com/st11/voicekey.htm, pp. 1–7.

T.C. Phipps & R.A. King, "Biometric in Less Than 40 Bytes," *Speech Technology On Line*, 10–Nov. 1997, http://www.speechtechmag.com/st10/40bytes.htm, pp. 1–6.

"Knock, Knock: Who's There?" *Speech Technology On Line*, Aug. 9, 1997, http://www.speechtechmag.com/st09/knckknck.htm, pp. 1–4.

Frank Smead, "Know the Difference Between Recognition and Verification," *Speech Technology On Line*, Jun. 7, 1998, http://www.speechtechmag.com/st08/knowdiff.htm, p. 1.

"New Speaker Verification API is Announced," *Speech Technology On Line*, Jun. 7, 1997, http://www.speechtechmag.com/st08/svapi.htm, pp. 1–2.

Elizabeth Boyle, "Why Your Bank Needs to Hear Your Voice," *Speech Technology On Line*, Jun. 7, 1997, http://www.speechtechmag.com/st08/bankhear.htm, pp. 1–3.

Graeme Kinsey, "Voice Verifies Your Money is Safe," *Speech Technology On Line*, Oct. 11, 1996, http://www.sppechtechmag.com/st05/voicverf.htm, pp. 1–5.

T–Netix, Inc., "Performance Practicalities," 1998, pp. 109, 145–169, 178a–e, 299–308.

Maarten Willems, "Telephones Present a New Face," *Speech Technology*, Jun. 7, 1998, pp. 16, 18–24.

Judith Markowitz, "Surveying the Territory," *Speech Technology*, Aug. 9, 1998, pp. 24.

"IBM Talks Up New ViaVoice Technologies", *Wall Street & Technology*, May 1999, p. 16.

Laure Edwards, "Its Listens, and Understands," *Wall Street & Technology*, Nov. 1998, pp. 22–23.

Jennifer Tomaro, "Timemac Selects Integrated EIC/Nuance Solution," *Computer Telephony*, Dec. 20, 1999, http://www.telecomlibrary.com/content/news/122099.timemac.html, pp. 1–2.

"Edify Releases Electronic Workforce 6.1," *Computer Telephony*, Jul. 30, 1999, http://www.telecomlibrary.com/content/news/edify5.html, pp. 1–2.

Brandon Friesen & John Jainschigg, "Business Neurology 101," *Computer Telephony*, Jun. 1999, http://www.telecomlibrary.com/db_area/archives/ComputerTelepho . . . /Business_1_2072.ht, pp. 1–14.

Ellen Muraskin, "Speech Rec," *Computer Telephony*, May 1999, http://www.telecomlibrary.com/db_area/archives/ComputerTelephon . . . /Speech_1_2010.ht, pp. 1–9.

"CTExpoSpring99," *Computer Telephony*, Apr. 1999, http://www.telecomlibrary.com/db_area/archives/Compute . . ./CTExpoSring99_1_1921.ht, pp. 1–14.

John Jainschigg, "Cool Stuff from CT Demo/Expo!," *Teleconnect*, Nov. 1998, http://www.telecomlibrary.com/db_area/archives/Teleconnect/1998/No . . . ?Cool_2_1618.ht, pp. 1–6.

"The Best of the Rest," *Computer Telephony*, Nov. 1998, http://www.telecomlibrary.com/db_area/archives/ComputerTelephony/1 . . . /The_1_1596.ht, pp. 1–15.

"First Looks," *Teleconnect*, Nov. 1998, http://www.telecomlibrary.com/db_area/archives/Teleconnect/1998/No. ./First_2_1620.ht, pp. 1–6.

"Teleconnect's Best of Show Picks," *Teleconnect*, Dec. 1997, http://www.telecomlibrary.com/db_area/archives/Teleconnect/1997/Dec. 2_834.htm, pp. 1–4.

"Low–end DSP Cards—CT's Best Deal," *Computer Telephony*, Oct. 1996 http://www.telecomlibrary.com/db_area/archives/ComputerTelephony/1996/O . . ./1_631.ht, pp. 1–7.

"Buy Decent Tools and Test, Test, Test," *Computer Telephony*, Oct. 1996, http://www.telecomlibrary.com/db_area/archives/ComputerTelephony/1996/O . . .1_630,ht, pp. 1–10.

Mike Waresk, "CT VAR Winners Reveal their most Useful Tools," *Computer Telephony*, Aug. 1996 http://www.telecomlibrary.com/db_area/archives/ComputerTelephony/1996/A . . . /1_390.ht, pp. 1–22.

"CT VAR Winners Reveal their most Useful Tools (Continued)," *Computer Telephony*, Jul. 1996, http://www.telecomlibrary.com/db_area/archives/ComputerTelephony/1996/July/1_380.htm, pp. 1–9.

"Speech Rec Rules," *Computer Telephony*, Jun. 1996, http://www.telecomlibary.com/db_area/archives/ComputerTelephony/1996/June/1_352.htm, pp. 1–11.

Betty Yuan, "Roll the Tape," *Teleconnect*, http://www.telecomlibary.com/db_area/archives/Teleconnect/. . . /Voicelogging.qxd–01.htm, pp. 1–5.

"Roll the Tape," *Teleconnect*, http://www.telecomlibrary.com/db_area/archives/Teleconnect/ . . . /Voicelogging.qxd–02.htm, p. 1.

Brandon Friesen, "Nortel Adds Periphonics," *Computer Telephony*, Dec. 21, 1999, http://www.telecomlibrary.com/content/news/122199.nortel.html, pp. 1–2.

"Periphonics Adds Barge–In," *Computer Telephony*, Dec. 7, 1999, http://www.telecomlibary.com/content/news/12071999.barge.html, pp. 1–2.

"Automatic for the People," *Teleconnect*, http://www.telecomlibary.com/db_area/archives/Teleconnect/19 . . . /AutoAttend.qxd_03.htm, p. 1.

Melissa Selbert, "CMA Telecom '98," *Teleconnect*, Nov. 1998, http://www.telecomlibrary.com/db_area/archives/Teleconnect/1998/No . . ./CMA_2)1616.ht, pp. 1–5.

"Make Sure You Know Who's Calling," *Teleconnect*, Jun. 1997, http://www.telecomlibrary.com/db_area/archives/Teleconnect/1997,June/2_719/1151.htm, pp. 1.

"Telemanagement Products and Services," *Teleconnect*, Jun. 1997, http://www.telecomlibrary.com/db_area/archives/Teleconnect/1997/June/2_719.htm, pp. 1–18.

Bachir Halimi, "Bachir Halimi's 15 Best," *Computer Telephony*, Mar. 1997, http://www.telecomlibrary.com/db_area/archives/ComputerTelephony/1997,M . . ./1_116.ht, pp. 1–4.

"Jeff Hills's 6 Best," *Computer Telephony*, Mar. 1997, http://www.telecomlibrary.com/db_area/archives/ComputerTelephony/1997/M . . ./1_114.ht, p. 1.

\* cited by examiner

METHOD AND APPARATUS FOR ENROLLING A USER FOR VOICE RECOGNITION

RELATED APPLICATIONS

This application is a continuation in part of application Ser. No. 09/351,723 entitled, "Method and System for Identifying a User by Voice" filed on Jul. 12, 1999 by Robert Wohlsen and Sue McNeill, having the same assignee as this application and is incorporated herein by reference in its entirety.

FIELD OF THE INVENTION

The present invention is related to computer software and more specifically to computer software for voice recognition.

BACKGROUND OF THE INVENTION

Many computer systems allow access based on a password. A user of the system identifies himself or herself as having an account on the computer system using a user identifier, such as an account number, and a password. If the user does not enter the correct password for the account, access to the system is denied. Passwords can work well for systems to which a user is connected using a keyboard or keypad. However, because passwords can be surreptitiously obtained by unauthorized users, passwords cannot completely prevent access by unauthorized users, particularly where interception of such passwords is possible.

Conventional speech recognition techniques may be employed to identify a user of a computer system in a manner that can be more secure than passwords entered from a keyboard or keypad of a telephone. The user of the system can speak or enter an account number on a touch-tone telephone keypad and speak a password. Speaker dependent voice recognition techniques can be used in place of a keyed-in password to verify the caller's identity. The spoken password is matched against a database of spoken passwords to identify if the way the user spoke the password matches the way that user spoke that password during an enrollment process in which the user's identity was verified.

However, speaking a password makes people feel uncomfortable. First, the user may feel uncomfortable speaking the password with others present. Users tend to reuse passwords from one system to another. Even though someone intercepting the password would find it difficult to use it to gain access to the system that verifies the user's voice using voice recognition, the same password could be used to gain entry using another non-voice-verified application. The user could select a password that he or she does not use on other systems, but passwords in general are frequently forgotten, and such a password would be even more likely to be forgotten.

One alternative to voice verification of a password is to use a challenge and response system. After the user enters his or her account number, the system randomly selects a word or phrase that the user is prompted to speak. This allows the system to verify the user's identity without requiring a user to speak an otherwise secret password or even remember any password. However, to properly verify the identity of a user, a lengthy enrollment procedure is often required to allow the user to speak all of the sounds that he or she could be required to speak when responding to a challenge phrase. Users often find such enrollment cumbersome, especially where the words are not logically connected. Without requiring a sufficiently thorough enrollment procedure, accuracy of verification or security of the system can be compromised.

Where it is possible to have multiple users sharing a single account, speaker verification enrollment techniques are further complicated by requiring the user to identify himself or herself using an identifier that is in addition to the account number. For example, if a husband and wife share a brokerage account, during enrollment, each could be prompted to key into a touch-tone telephone keypad the account number and his or her own social security number. However, this would lengthen an enrollment process that for some users is too lengthy no matter how long it is.

What is needed is a method and apparatus that can enroll a user for an accurate and secure voice recognition speaker verification system that does not require the user to remember or speak a secret password and uses a short enrollment process, even for accounts with multiple users.

SUMMARY OF INVENTION

A method and apparatus enrolls a user for a challenge and response speaker verification system by first requesting the user speak or enter an account number, then requesting the user to speak a number that is known to the user, such as a social security number or other identifier. The spoken social security number can be recognized using speaker independent voice recognition to distinguish between multiple users sharing the same account number. In addition, the spoken social security number is used to extract a voiceprint for the user. The user is prompted to speak a set of additional sequences of numbers generated so that the social security number already spoken and the set of additional sequences includes all of the decimal digits 0–9 a minimum number of times (e.g. three) to provide a complete enrollment record of how a user speaks each decimal digit. A challenge and response procedure can then use a string of decimal digits to provide secure and accurate speaker verification.

DETAILED DESCRIPTION OF A PREFERRED EMBODIMENT

Figure 1:
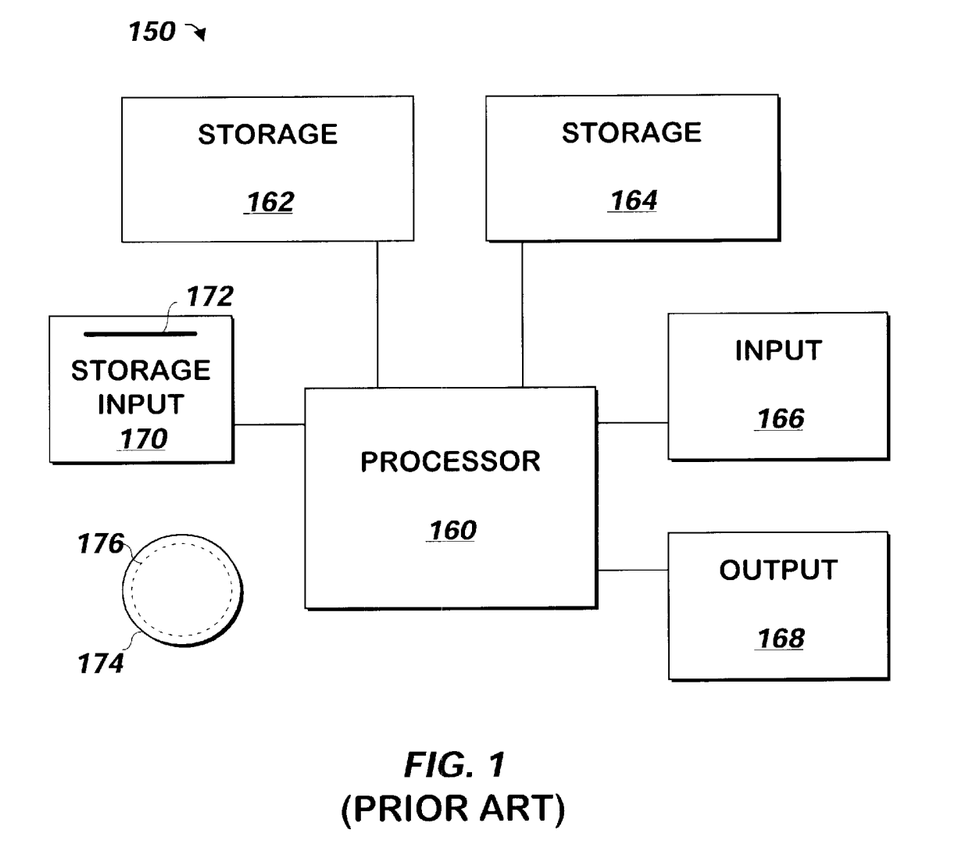
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, multiple computer systems 150 are used to implement the present invention. A conventional mainframe computer such as a conventional S/390 computer system commercially available from IBM Corporation of Armonk, N.Y. may be coupled to one or more conventional Sun Microsystems Ultra Sparc computer systems running the Solaris 2.5.1 operating system commercially available from Sun Microsystems of Mountain View, Calif., although other systems may be used. A VPS recognizer commercially available from Periphonics Corporation of Bohemia, N.Y. and any of Nuance 6, Nuance Verifier, Nuance Developer's ToolKit and Speech Objects software commercially available from Nuance Communications of Menlo Park, Calif. are used with the Ultra Sparc computer to perform certain recognition functions. However, other systems may be used.

Figure 2:
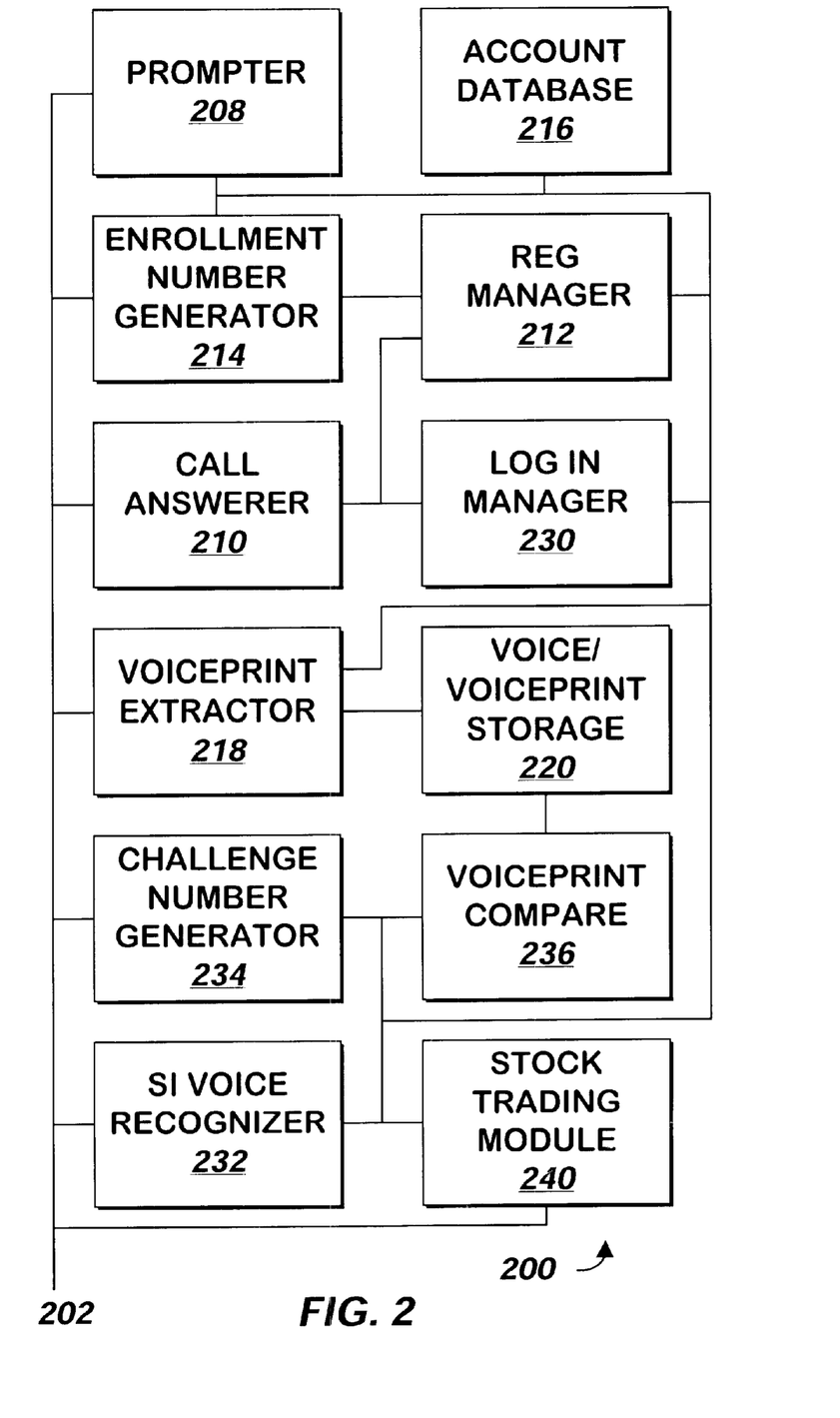
FIG. 2 is a block schematic diagram of an apparatus for enrolling and verifying an identity of a user according to one embodiment of the present invention.

Referring now to FIG. 2, an apparatus for enrolling, and verifying an identity of, a user is shown according to one embodiment of the present invention. Call answerer 210 receives ring signals from input/output 202, coupled to the public switched telephone network and generates answer signals in response. Call answerer 210 detects the called number of the call provided by the telephone network as conventional DNIS digits and signals registration manager 212 if the DNIS digits correspond to one or more numbers callers call to register to the apparatus 200, and signals log in manager 230 is the DNIS digits correspond to one or more numbers callers call to log in to the apparatus 200. In an alternate embodiment, DNIS is not used and call answerer 210 signals registration manager 212 or log in manager 230 based on the physical trunk number or logical identifier on which the call originated. In still another embodiment, users are prompted to press '1' to log in or '2' to register.

After registration manager 212 receives the signal from call answerer 210, registration manager 212 signals prompter 208. Prompter 208 prompts the user to enter his or her account number using the touch tone keypad or to speak his or her account number into the telephone.

Registration manager 212 signals call answerer 210 to detect, and if detected, recognize, the digits returned by the caller using conventional DTMF digit detection and recognition techniques and signals speaker-independent voice recognizer 232 to detect, and if detected, recognize, the spoken account number using conventional speaker-independent voice detection and recognition techniques. If the caller enters the account number using the keypad, call answerer 210 recognizes the digits and passes them to registration manager 212. If the caller speaks the account number, speaker-independent voice recognizer 232 recognizes the digits and passes them to registration manager 212.

Registration manager 212 looks up the user's password in account database 216 using the account number entered by the user. Account database 216 is a conventional database that stores account information associated with an account number. The account information can include a password and the social security numbers or other identifier of any users authorized to use that account. Social security numbers are used below as an example of an account identifier, but any unique number or phrase may also be used.

Registration manager 212 signals prompter 208 to prompt the user for his password and signals call answerer 210 and speaker independent voice recognizer 232 to again detect and recognize either the touch tone digits pressed by the caller or the digits spoken by the caller as described above with reference to the account number. Call answerer 210 or speaker independent voice recognizer 232 detects and recognizes the digits as described above and passes them to registration manager 212, which, if the digits match those it retrieved from account database 216 continues with the registration process. Otherwise, registration manager 212 signals call answerer 210 to provide signals causing the caller to be transferred to an operator for assistance.

In one embodiment, call answerer 210 is capable of detecting and decoding conventional automatic number identification digits that arrive with the call. Call answerer 210 provides these digits to registration manager 212, which looks up in account database 216 one or a list of telephone number that are associated with the caller's account number. When registration manager 212 looks up the caller's password, it also verifies that the some or all of the ANI digits match some or all of the one or more telephone numbers associated with the account number. This way, the authenticity of the caller can be further verified by only allowing registration to occur from the user's home or business telephone line, for example.

If the registration process continues, registration manager 212 sends to voiceprint extractor 218 the account number or other identifier of the user. Registration manager signals prompter 208, which prompts the user to speak his or her social security number in one embodiment, or any other sequence of digits that can differentiate any users sharing the account and/or that the caller would readily know without being told the exact numbers to speak in another embodiment.

If multiple individuals are not allowed to share a single account, or if such accounts are allowed but the account corresponding to the account number received from the user does not have multiple users sharing the account, registration manager 212 retrieves, the social security number or other easily memorable number of the account from account database 216 using the account number received previously. Registration manager 212 provides the social security number to voiceprint extractor 218 and signals it to extract a voiceprint from the user's response. If multiple individuals can share a single account, registration manager 212 signals speaker independent voice recognizer 232 to recognize the social security number. Speaker independent voice recognizer 232 recognizes the social security or other number, for example using conventional speaker-independent voice recognition techniques and returns the one or more social security numbers it recognizes to registration manager 212. Registration manager 212 retrieves all of the social security numbers associated with the account from account database 216 and verifies that the one of the numbers recognized is the social security number of one of the users associated with the account, and if so, passes the social security number to voiceprint extractor 218.

Voiceprint extractor 218 also receives the spoken digits from the caller and either digitizes and stores internally or in voice/voiceprint storage 220 or extracts a voiceprint from the caller using conventional voiceprint extraction techniques.

In one embodiment, when voiceprint extractor 218 receives a response from a user during registration, it extracts a voiceprint from the first response received from that user during a registration session and uses subsequent responses to enhance the voiceprint extracted. In another embodiment all responses from a user are digitized using conventional speech digitization techniques and stored either internally to voiceprint extractor or in voice/voiceprint storage 220, and when all responses for the registration session have been received from the user and digitized, voiceprint extractor 218 appends the digitized version of such responses to one another and extracts a voiceprint on the sum of all of the responses. Extraction of the sum may produce better extraction than extraction of the responses individually.

At the time of extraction, voiceprint extractor 218 uses conventional speaker verification modeling techniques to extract one or more characteristics and/or patterns of the user's voice that can uniquely identify the user from the general population or at least discriminate a user from at least approximately 99.5% of the general population with near zero false acceptances and near zero false rejections. Because voiceprint extractor 218 receives all of the numbers spoken by the caller, it can use the spoken numbers to identify the sounds expected and classify what the user says according to the numbers it receives. When the voiceprint is extracted, voiceprint extractor 218 stores the voiceprint it extracts into voice/voiceprint storage 220, indexed by the user's account number or other identifier of the user such as a customer identifier. An identifier of the user different from the user's account number may be used to enhance security, so that even if the stored voiceprints are lost or misappropriated, they cannot be used to log into a user's account. A database such as one stored in account database 216 or a mathematical function may be used to map the customer identifier to the account number.

Registration manager 212 provides the social security number it retrieves from account database 216 to enrollment number generator 214. Enrollment number generator 214 uses the social security number it receives to generate a set of sequences of four numbers per sequence. Enrollment number generator 214 generates the sequences by scanning the individual decimal digits of the social security number and tallying the number of times each digit 0–9 is in the social security number. Enrollment number generator 214 generates a set of three four-digit pseudo-random sequences so that the social security number and the sequences it generates contains every decimal digit as many times as possible.

For example, if the social security number is 112-55-6677, the digits 1, 5, 6 and 7 are represented two or more times and the digit 2 is represented once. The remaining decimal digits are not represented at all. Enrollment number generator 214 will generate a set of sequences that include the digits 0, 3, 4, 8 and 9 at least twice, and the digit 2 at least once. For example, the set of sequences may be "0348 9843 0922".

In addition, enrollment number generator 214 inserts a standard sequence that will be spoken by all callers, such as "4679" to the set of sequences it generates. An utterance that includes the spoken response, "4679" can be used to generate particularly high quality voiceprints. Thus, the sequences generated contain a standard sequence such as "4679" that can be used to generate high quality voiceprints in addition to sequences which may not generate voiceprints that are as high quality as "4679".

Enrollment number generator 214 provides the set of sequences it generates to registration manager 212 along with an indication describing where in the set the standard sequence was inserted.

Registration manager 212 sends each sequence in the set to prompter 208, one at a time, with instructions to prompt the user to speak the sequence: For example using the set of sequences described above, prompter might say, "Please say 0348." "Please say 9843." "Please say 0922." "Please say 4679".

As registration manager 212 sends the sequences to prompter 208, registration manager 212 also signals voiceprint extractor 218 with the account number or customer identifier of the user and the set of digits in the sequence being prompted.

In the embodiment in which the voiceprint is extracted from the social security number and then refined using other responses, voiceprint extractor 218 uses the account number or customer identifier to retrieve from voice/voiceprint storage 220 the voiceprint of the user. Voiceprint extractor 218 extracts the voiceprint of the user from the responses the user utters in response to the prompts to speak the sequences, and refines the voiceprint it retrieved from voice/voiceprint storage 220 in the embodiment in which the voiceprint is refined. Voiceprint extractor 218 then stores in voice/voiceprint storage 220 the voiceprint it refines indexed by the user's account identifier.

In the embodiment, in which the voiceprint is extracted once at the end, voiceprint extractor 218 digitizes and stores in voice/voiceprint storage 220 all of the responses and signals registration manager 212. Registration manager 212 signals voiceprint extractor 218 to retrieve from voice/voiceprint storage the digitized voice responses, including the digitized representations of the social security number, the sequences and the standard sequence, appends them to one another and extracts a voiceprint from all of them.

In one embodiment, as each sequence is being recognized, registration manager 212 also provides the sequences and a threshold confidence score to speaker independent voice recognizer 232 to cause speaker independent voice recognizer 232 to recognize each sequence using conventional speaker independent voice recognition techniques and identify whether the digits it recognized corresponded to the digits it received within a confidence level greater than or equal to the threshold confidence score it receives from registration manager 212. Speaker independent voice recognizer 232 recognizes each spoken sequence as any of several possible sequences and assigns a confidence level to each possible sequence. Speaker independent voice recognizer 232 identifies whether it has high confidence that the digits received from registration manager 212 were the digits it recognized by matching the digits received from registration manager 212 to one of the possible sequences having a confidence score greater or equal to the confidence level threshold it receives from registration manager 212. The exact confidence level threshold to use will be a function of the equipment used. Speaker independent voice recognizer 232 signals registration manager 212 with the result. If the confidence level does not meet or exceed the threshold, registration manager 212 signals voiceprint extractor 218 to discard the voiceprint of the response and reprompts the user to speak the sequence. In this manner, extraneous background noises that can affect the speaker independent voice recognition will not adversely impact the user's voiceprint.

In one embodiment, the spoken standard sequence is used for two purposes. In addition to refining the user's voiceprint with the response for the standard sequence or for digitizing and storing for the embodiment in which the extraction is performed on the social security number and sequences together, voiceprint extractor 218 uses its knowledge of the position of the standard sequence among the set of sequences generated to store in voice/voiceprint storage 220 the voiceprint of the standard sequence that was extracted from the sequence containing the sequence of digits that all users are requested to speak. In the example above, this voiceprint was the last voiceprint requested. Voiceprint extractor 218 signals registration manager 212 when it has completed extracting and refining the voiceprint and has stored the refined voiceprint and the voiceprint of the standard sequence.

Registration manager 212 signals voiceprint compare 236 with the account number or customer identifier of the user. Voiceprint compare 236 retrieves the voiceprint of the standard sequence from voice/voiceprint storage 220 and compares it against some or all of the voiceprints of the standard sequence spoken by other users. The other users may be users who have common characteristics of the user being enrolled such as a young-sounding, male voice. The other users may be all of the users sharing those characteristics or a sample of some of the other user's having those characteristics. Voiceprint compare 236 returns to registration manager 212 a score between −1 and +1, with −1 indicating that the voiceprint is highly distinctive from the other voiceprints, and +1 indicating that the common voiceprint of the user is very similar to all the other voiceprints.

If registration manager 212 receives a score that is greater than zero, registration manager 212 provides, one at a time, to prompter 208 a new set of sequences to the user with each digit distributed at least once in the set with an indication to provide instructions to the user to speak the sequences as described above. Registration manager 212 also signals voiceprint extractor 218 with the account number or customer identifier of the user. Voiceprint extractor 218 retrieves the voiceprint from voice/voiceprint storage 220, extracts the voiceprints from each sequence and uses it to further refine the voiceprint it retrieved. Voiceprint extractor 218 stores the rerefined voiceprint- in voice/voiceprint storage 220.

In another embodiment, the comparison with other users is performed in a batch process at a time after the user completes the registration process. The results of the. comparison are stored in voice/voiceprint storage 220 indexed with the user's account number. Either the user is phoned to request reregistration or when that user attempts to log into the system, the registration process described above is repeated for that user. The results of the second registration process are used to refine the voiceprint that was stored for the user in the first registration process.

When a user dials to log into the computer system 240, call answerer 210 accepts the call as described above. If the DNIS digits or trunk number or push button selection corresponds to logging in, call answerer 210 signals log in manager 230. Log in manager 230 signals prompter 208 to prompt the user to speak or use the touch tone keypad on his or her telephone to enter his or her account number and signals call answerer 210 to detect and perform DTMF tone recognition on the response and signals speaker independent voice recognizer 232 to detect and recognize a spoken response. Call answerer 210 uses conventional DTMF tone recognition or speaker independent voice recognizer 232 uses conventional speaker independent voice recognition techniques to recognize the digits entered or spoken and passes the digits recognized to log in manager 230.

Log in manager 230 signals challenge number generator 234 to return a random sequence of four digits. Log in manager 230 provides the random sequence of four digits it receives from challenge number generator 234 to prompter 208 along with an instruction to prompt the user to speak the digits. Log in manager 230 provides the four digits being prompted to voiceprint extractor 218 to cause voiceprint extractor 218 to extract a voiceprint of the response and store the extracted voiceprint in a special area of voice/voiceprint storage 220. Log in manager 230 also provides the digits and a threshold confidence score to speaker independent voice recognizer to identify whether the digits are recognized with a high level of confidence as described above with respect to registration manager 212. Prompter 208 prompts the user to speak the digits. Voiceprint extractor 218 performs the extraction and storage or digitization and storage and speaker independent voice recognizer 232 performs the recognition and reports to log in manager 230 whether the digits it received were recognized in the spoken response with a confidence score above the threshold as described above. Voiceprint extractor signals log in manager 230.

If speaker independent voice recognizer 232 reports that the digits spoken matched the digits received from log in manager 230, log in manager 230 provides to voiceprint compare 236 the account number it received from speaker independent voice recognizer 232 and instructs voiceprint compare to compare the voiceprint extracted and stored in the special area of voice/voiceprint storage 220 to the voiceprint stored for the account number in voice/voiceprint storage 220 and provide a confidence score. (If speaker independent voice recognizer 232 does not report that the recognized digits matched the digits received from log in manager 230, log in manager repeats the process using the same or a different challenge sequence). Voiceprint compare 236 retrieves from voice/voiceprint storage 220 the voiceprint stored for the user whose account number is received from registration manager 212 and the voiceprint in the special area of voice/voiceprint storage 220. Voiceprint compare 236 uses conventional voiceprint matching techniques to identify the confidence level that the voiceprint in the special area of voice/voiceprint storage 220 is from the same user as the voiceprint in voice/voiceprint storage 220 corresponding to the account number it receives from log in manager 230. If multiple users share an account, voiceprint compare 236 identifies if the voiceprint in the special area of voice/voiceprint storage 220 matches any of the voiceprints stored for that account. Voiceprint compare 236 returns to registration manager 212 a confidence score between −1 and +1, with −1 indicating that there is no correlation between the two voiceprints and +1 indicating a perfect match between the two voiceprints.

Log in manager 230 determines if the confidence score is sufficiently high. In one embodiment, sufficiently high means a confidence score of +0.5 or above, in another embodiment, any positive confidence score is sufficiently high.

If the confidence score is not sufficiently high, registration manager 212 generates an additional four digit challenge sequence as described above and causes the process of prompting, recognizing, extracting, comparing and checking the confidence score described above to repeat. In one embodiment, the voiceprint already stored in the special area of voice/voiceprint storage 220 is enhanced by voiceprint extractor 218 using the new voiceprint, and in another embodiment, the voiceprint already stored in the special area is discarded. In still another embodiment, the enhancement is performed, but both the enhanced voiceprint and the most recent voiceprint by itself is stored in the special area, and each are compared and scored against the voiceprint for the user corresponding to the account number received from log in manager 230 by voiceprint compare 236. The apparatus 200 repeats the process described above until the enhanced voiceprint is sufficiently distinct. In one embodiment, log in manager 230 maintains an internal counter and if the counter exceeds a threshold level, log in manager 230 stops repeating, signals prompter 208 to instruct the caller that his or her voice is not being recognized, and signals call answerer 210 to transfer the caller to an operator or signals prompter to prompt the user to enter his or her password on a touch-tone keypad and signals call answerer 210 to decode and return the digits. Log in manager 230 approves the caller for log in as described below if the password matches a password log in manager 230 retrieves from account storage 216. In one embodiment, if both confidence scores are not sufficiently high, but both are above a second threshold that is near the level of being sufficiently high, the user is given a third chance as described above, otherwise log in manager 230 instructs call answerer 210 to transfer the caller to the operator after the second chance or prompted to key in his or her password on the touch tone keypad.

If the user is verified as described above, log in manager 230 signals the apparatus that will allow the user to perform the function the user intended. For example, in a stock trading application, log in manager 230 would signal stock trading module 240 by providing the user's account number. Trading module can allow the user to trade stocks or other securities or to obtain information about securities.

In one embodiment, after a user has successfully logged in, log in manager 230 signals voiceprint extractor 218 with the account number of the user who logged in. Voiceprint extractor 218 uses the account number to retrieve from voice/voiceprint storage 220 the voiceprint for that user. Voiceprint extractor 218 uses the voiceprint stored in the special area of voice/voiceprint storage 220 to refine the voiceprint of the user, and stores the refined voiceprint into voice/voiceprint storage 220 in place of the user's voiceprint it had retrieved.

Figure 3:
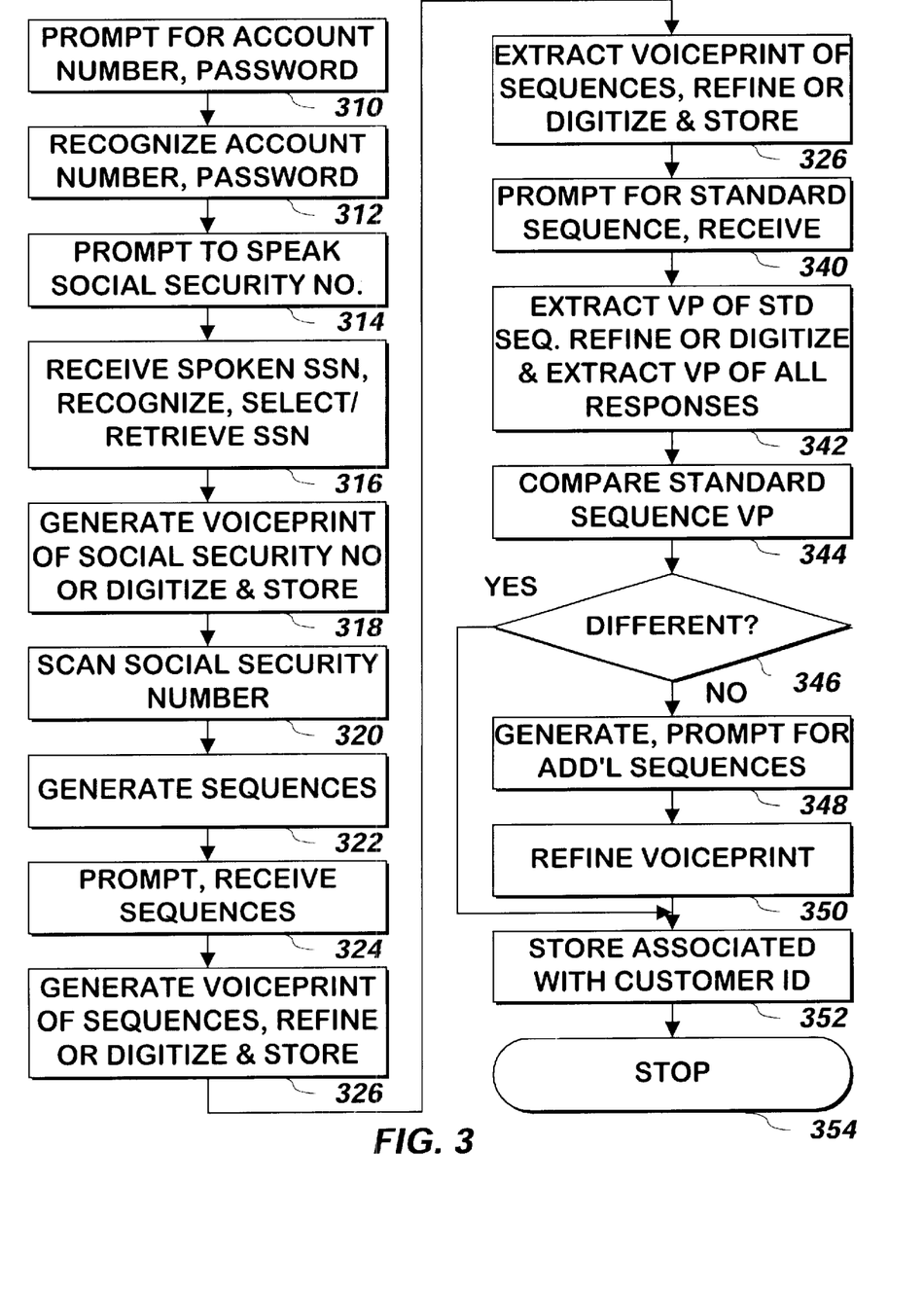
FIG. 3 is a flowchart illustrating a method of enrolling a user for speaker verification according to one embodiment of the present invention.

Referring now to FIG. 3, a method of enrolling a user for speaker verification is shown according to one embodiment of the present invention. The user is prompted for an account number and password 310 as described above. Conventional touch-tone recognition or speaker independent voice recognition techniques are used to recognize 312 the account number and password received from the user as described above.

The user is prompted 314 to speak his or her social security number. The spoken social security number is received 316. As part of step 316, the spoken social security number can be recognized using conventional speaker independent voice recognition techniques to select a user from an account shared by more than one user as described above or to further verify the user even if only one user is allowed per account number. If there is only a single social security number associated with the account, it may be retrieved as part of step 316.

In one embodiment, a voiceprint is generated 318 using the spoken social security number received in step 316 and the stored for the user as described above. In another embodiment, the spoken social security number is digitized and stored 318.

The stored social security number retrieved in step 316 is scanned 320 to identify the number of times each digit appears in the social security number as described above. Sequences are generated.322 using the scan of the social security number as described above. The user is prompted 324 to speak the sequences generated in step 322 and the voice responses are received.

In one embodiment, a voiceprint is generated 326 using the responses and the numbers as described above and used to refine the voiceprint extracted in step 318, and in another embodiment, the responses received in step 324 are digitized and stored 326.

In one embodiment, step 326 includes performing speaker independent voice recognition on the responses to verify that they can be recognized as each sequence above a certain confidence level as described above. In one embodiment, the sequences are prompted and received one at a time and the voiceprint and recognition operations are performed as the responses are received.

The user is prompted 340 to speak a standard sequence and a voiceprint of the standard sequence is generated 342. Step 340 is shown following the prompting and receiving of sequences of step 324, but the standard sequence may be prompted among the prompts for the other sequences.

In one embodiment, the voiceprint generated in step 342 is used to refine 342 the voiceprint for the user and the voiceprint of the standard sequence is stored associated with the user's account number or customer identifier. In another embodiment, the response received in step 340 is digitized and stored in addition to generating a voiceprint of the response to the standard sequence. The responses digitized in steps 318, 326 and 342 are all used to generate a voiceprint, for example by appending them to one another and generating a voiceprint of the appended responses as described above.

The voiceprint of the standard sequence is also used to compare 344 against the voiceprint of the standard sequence for other users to identify how different the user's voice is from other users as described above If the result of the comparison step is that the user's voiceprint of the standard sequence is sufficiently distinct from that the voiceprint of the standard sequence from other users, the method continues at step 352. If the result of the comparison in step 344 is that the user's voiceprint of the standard sequence is not much different from that of other user's 346, the user may be prompted 348 for one or more additional sequences either immediately or at a later time as described above. If the user is to be prompted at a later time, the user's voiceprint is stored as part of step 342 and marked as requiring additional refinement after step 346 as described above. The user's response to those sequences can be extracted 350 and the voiceprint for the user refined. The method continues at step 352.

At step 352, the user's voiceprint is stored associated with the account number or other identifier of the user. The method terminates 354.

Figure 4:
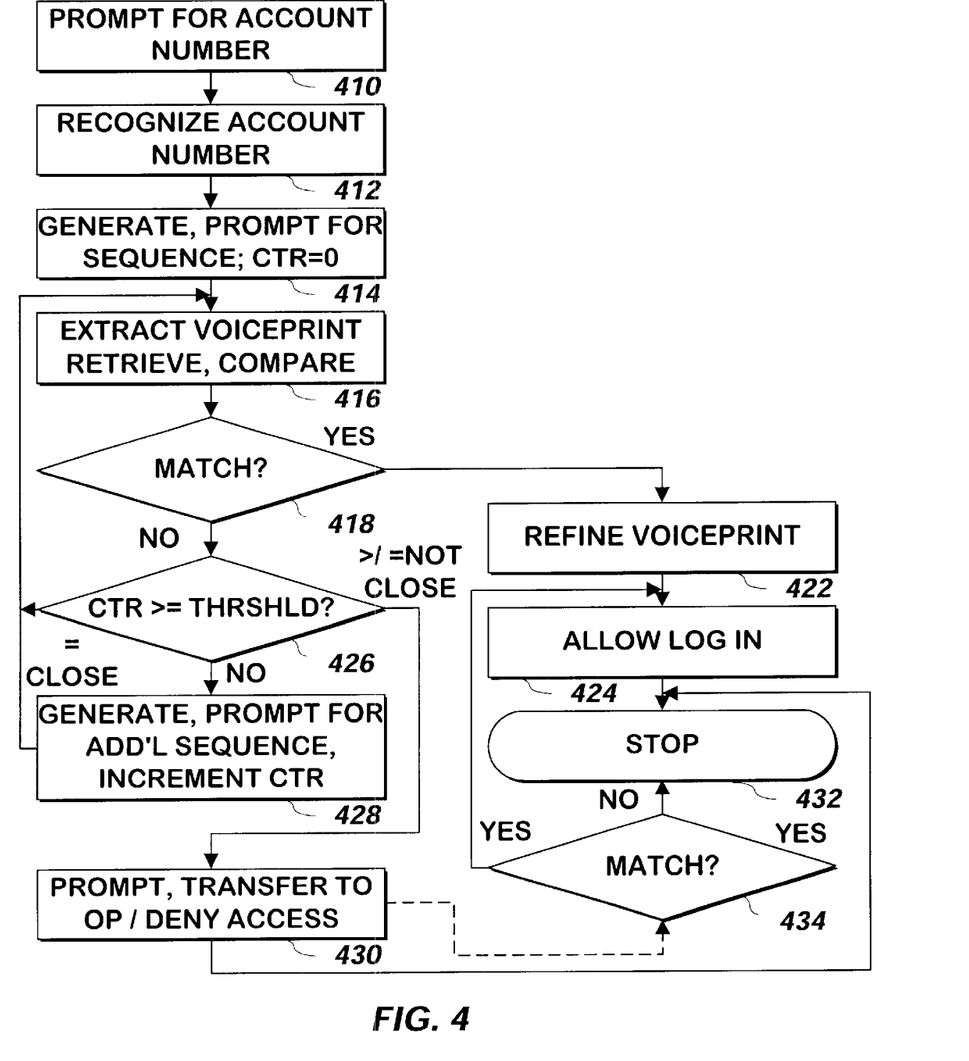
FIG. 4 is a flowchart illustrating a method of verifying a user enrolled using the method of FIG. 3 according to one embodiment of the present invention.

Referring now to FIG. 4, a method of verifying a user is shown according to one embodiment of the present invention. A prompt is provided 410 for the user to speak or use a touch tone keypad to enter an account number. An account number is recognized from the response to the prompt of step 410 either using conventional DTMF tone recognition or speaker-independent voice recognition techniques. A challenge string of random numbers is generated and the user is prompted 414 to speak the string as described above. A counter may be initialized to zero to keep track of the number of times an attempt is made to match the user to voiceprints corresponding to the account numbers recognized in step 412.

A voiceprint is extracted 416 from the response to the prompt received from the user. The extracted voiceprint is used to compare stored voiceprints corresponding to the account number recognized in step 412 as described above. In one embodiment, speaker independent voice recognition techniques are used as part of step 416 to verify that the user's response could be recognized with sufficient confidence to be the challenge string and if not, the user is requested to repeat the challenge string or a new challenge string is generated and the user is prompted for this challenge string as described above.

If the extracted voiceprint matches with sufficient confidence as described above 418, the extracted voiceprint may be optionally used to refine 422 the stored voiceprint for the matching account number and the refined voiceprint is stored in place of it as described above. The user is allowed to log in, for example by providing the account number of the user as evidence of verification. Otherwise 418 if the counter is greater than or equal to a threshold such as two or three, the user is prompted that the system did not recognize his voice and the user is transferred to an operator or the user is prompted to enter his or her password on a touch tone keypad or the user is simply denied further access and disconnected.

If the user is prompted to key in a password as part of step 430, the password is checked and if it matches the password for the account 434, the method continues at step 424 as represented by the dashed line from step 430.

In another embodiment, at step 426 if the user's responses were relatively close (e.g. they matched with a confidence score near, but not above a threshold confidence score) and the counter is equal to the threshold, the method continues at step 416 and if the counter exceeds the threshold or the user's responses were not sufficiently close, the method continues at step 430.

What is claimed is:

1. A method of registering a user's voice, comprising:
   prompting the user to speak a first number comprising a first plurality of digits;
   receiving a first spoken response from the user;
   identifying at least one second number comprising a second plurality of digits responsive to a distribution of the first plurality of digits in the first number;
   prompting the user to speak the at least one second number;
   receiving a second spoken response from the user; and
   creating a voiceprint responsive to the first spoken response and the second spoken response.

2. The method of claim 1 wherein the first plurality of digits and the second plurality of digits contain at least a minimum number greater than zero of every decimal digit in a set of '0' through '9'.

3. The method of claim 2 wherein the first plurality of digits and the second plurality of digits contain at least two of every decimal digit in the set of '0' through '9'.

4. The method of claim 1 wherein the first number is a number capable of distinguishing the user from among a plurality of users sharing an account.

5. The method of claim 1 wherein the first number is a social security number of the user.

6. The method of claim 1 comprising the additional steps of:
   prompting the user for at least one third number;
   receiving a third spoken response;
   extracting a trial voiceprint from the third spoken response;
   comparing the trial voiceprint to at least a portion of the voiceprint; and
   responsive to the trial voiceprint sufficiently similar to the voiceprint, refining the voiceprint responsive to the trial voiceprint.

7. The method of claim 1 comprising the additional steps of:
   extracting a second voiceprint of at least a portion of the second spoken response;
   comparing the second voiceprint with a voiceprint generated by at least one other user; and
   responsive to the comparing step, prompting the user to speak a third number.

8. The method of claim 1 wherein at least one of the at least one second number comprises:
   a sequence of a plurality of digits useful for generating high quality voiceprints; and
   at least one additional digit.

9. A computer program product comprising a computer useable medium having computer readable program code embodied therein for registering a user's voice, the computer program product comprising:
   computer readable program code devices configured to cause a computer to prompt the user to speak a first number comprising a first plurality of digits;
   computer readable program code devices configured to cause a computer to receive a first spoken response from the user;
   computer readable program code devices configured to cause a computer to identify at least one second number comprising a second plurality of digits responsive to a distribution of the first plurality of digits in the first number;
   computer readable program code devices configured to cause a computer to prompt the user to speak the at least one second number;
   computer readable program code devices configured to cause a computer to receive a second spoken response from the user; and
   computer readable program code devices configured to cause a computer to create a voiceprint responsive to the first spoken response and the second spoken response.

10. The computer program product of claim 9 wherein the first plurality of digits and the second plurality of digits contain at least a minimum number greater than zero of every decimal digit in a set of '0' through '9'.

11. The computer program product of claim 10 wherein the first plurality of digits and the second plurality of digits contain at least two of every decimal digit in the set of '0' through '9'.

12. The computer program product of claim 9 wherein the first number is a number capable of distinguishing the user from among a plurality of users sharing an account.

13. The computer program product of claim 9 wherein the first number is a social security number of the user.

14. The computer program product of claim 9 additionally comprising:

computer readable program code devices configured to cause a computer to prompt the user for at least one third number;

computer readable program code devices configured to cause a computer to receive a third spoken response;

computer readable program code devices configured to cause a computer to extract a trial voiceprint from the third spoken response;

computer readable program code devices configured to cause a computer to compare the trial voiceprint to at least a portion of the voiceprint; and computer readable program code devices configured to cause a computer to, responsive to the trial voiceprint sufficiently similar to voiceprint, refining the voiceprint responsive to the trial voiceprint.

15. The computer program product of claim 9 additionally comprising:

computer readable program code devices configured to cause a computer to extract a second voiceprint of at least a portion of the second spoken response;

computer readable program code devices configured to cause a computer to compare the second voiceprint with a voiceprint generated by at least one other user; and computer readable program code devices configured to cause a computer to, responsive to the computer readable program code devices configured to cause a computer to compare, prompt the user to speak a third number.

16. The computer program product of claim 9 wherein at least one of the at least one second number comprises:

a sequence of a plurality of digits useful for generating high quality voiceprints; and at least one additional digit.

17. An apparatus for registering a user for speech recognition, the apparatus having an input/output coupled for communication with the user, the apparatus comprising:

a prompter having an output coupled to the apparatus input/output, and an input operatively coupled for receiving at least one first number and at least one second number, the prompter for requesting from the user via the output the at least one first number and the at least one second number;

an enrollment number generator having an input operatively coupled for receiving the first number, the enrollment number generator for generating and providing at an output coupled to the prompter input at least one second number responsive to a distribution of a plurality of digits in the first number; and a voiceprint extractor having an input coupled to the apparatus input/output for receiving at least one first response to the prompt for the first number and at least one second response to the prompt for the second number, the voiceprint extractor for extracting a voiceprint responsive to the at least one first response and the at least one second response.

18. The apparatus of claim 19 wherein the enrollment number generator generates the second plurality of digits so that the first plurality of digits and the second plurality of digits contain at least a minimum number of every decimal digit in a set of '0' through '9'.

19. The apparatus of claim 18 wherein the minimum number is two.

20. The apparatus of claim 17 wherein the at least one first number is a number capable of distinguishing the user from among a plurality of users sharing an account.

21. The apparatus of claim 17 wherein the at least one first number is a social security number of the user.

* * * * *

UNITED STATES PATENT AND TRADEMARK OFFICE
CERTIFICATE OF CORRECTION

PATENT NO. : 6,681,205 B1  Page 1 of 1
DATED : December 17, 1999
INVENTOR(S) : Michelle San Martin, Robert C. Wohlsen and Cecily Baptist It is certified that error appears in the above-identified patent and that said Letters Patent is hereby corrected as shown below:

<u>Column 14,</u>
Line 23, "claim 19" should read -- claim 17 --.

Signed and Sealed this

Eleventh Day of May, 2004

JON W. DUDAS
*Acting Director of the United States Patent and Trademark Office*